May 16, 1961
J. ROSÁN
2,984,279
LOCKING INSERT WITH DEFORMABLE FLANGE
BEARING PERIPHERAL BITING TEETH
Filed Aug. 7, 1958
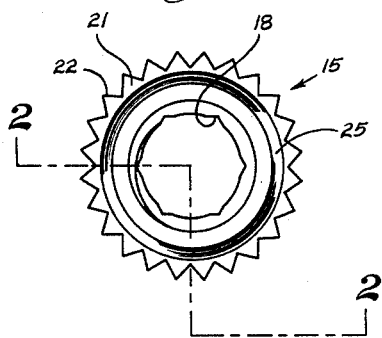
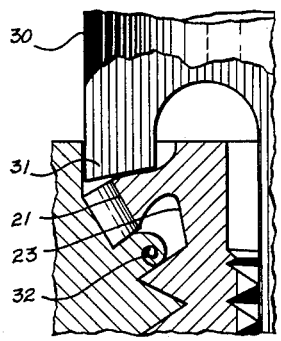
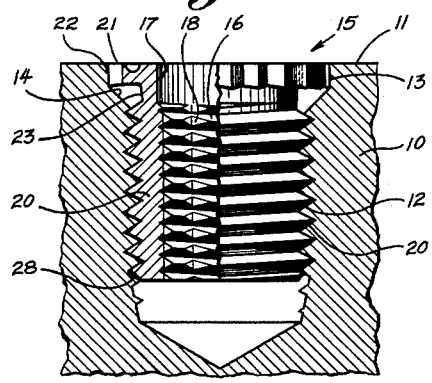
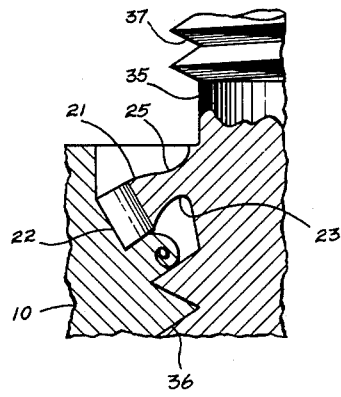
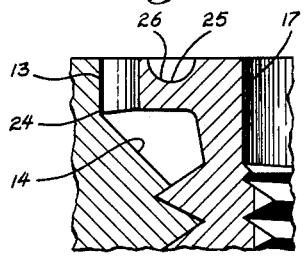
INVENTOR.
José Rosán
BY
ATTORNEY

United States Patent Office 2,984,279
Patented May 16, 1961

2,984,279

LOCKING INSERT WITH DEFORMABLE FLANGE BEARING PERIPHERAL BITING TEETH

José Rosán, Newport Beach, Calif., assignor to Rosán Engineering Corporation, Newport Beach, Calif., a corporation of California Filed Aug. 7, 1958, Ser. No. 753,753

3 Claims. (Cl. 151—41.73)

This invention relates generally to inserts designed for anchorage in bores of bodies of relatively soft materials, for such typical purposes as making various connections with such bodies, as for instance providing a secure mounting for a screwthreaded stud in such a body.

With the recent advent of widely extended use of many types of relatively soft bodies in construction, particularly in the aircraft industry, the problem of providing secure connections or anchorages to such bodies has become acute and has received much attention. Such relatively soft bodies as I have reference to include aluminum and magnesium alloys, plastics, woods, etc. Particularly in the case of aircraft construction, where the fastening is subject to constant vibratory action, assurance must be provided that the insert will not loosen and fail either by longitudinal displacement or by rotation.

The object of the present invention is to provide a simple, one-piece insert, of inexpensive construction, capable of forming a permanent anchorage in a relatively soft body for such a typical fastening element as a screw-threaded stud.

In accordance with a preferred form of the invention, the insert, which is designed for insertion and anchorage within a bored and counterbored body, embodies an externally screw threaded cylindrical body receivable in and screwthreadedly engageable with the said bore. The insert body has as its outer end an integral flange, serrated on its periphery, and of an initial diameter such as may be readily received within the counterbore. This integral flange is adapted to be bent or deflected, axially, after the tubular body has been screwed home, to cause its periphery to engage and bite into the soft body adjacent the counterbore and thereby lock the device against rotation.

The present invention will now be described in detail, reference for this purpose being had to the accompanying drawings, in which:

Figure 1 is a top plan view of one form of the invention.

Figure 2 is a section on broken-line 2—2 of Figure 1, showing the insert partially installed in a body of relatively soft material.

Figure 3 is an enlarged detail of a portion of Figure 2.

Figure 4 is an enlarged detail similar to Figure 3 but showing the insert in its final locking position, and a tool used to effect the locking action.

Figure 5 is a view similar to Figure 4, showing the invention incorporated in a stud.

Referring more particularly to the drawing, and especially to Figures 1 to 3, numeral 10 designates generally a body of relatively soft material, such as aluminum or magnesium alloy, plastic, or the like, having an outer surface 11. When I speak of a body of relative soft material, it will be understood, of coursse, that I refer to a body which is of a material softer than that of the insert. The insert is constructed of some suitable relatively hard material such as nylon, heat treated steel, brass, bronze or the like. As illustrated, the body 10 is formed with a screw threaded bore 12 extending inwardly from outer surface 11 and an enlarged cylindrical counterbore 13 extending inwardly from surface 11 to a predetermined depth, said counterbore being formed at its inner end or bottom with an outwardly facing shoulder 14, which is preferably beveled as shown.

The insert body, in this instance of generally tubular form, is designated generally by numeral 15 and is provided preferably with a central longitudinal screw threaded bore 16 adapted to receive a screw threaded stud, or the like, a portion 17 of the bore 16 at the outer end thereof being plain or unthreaded. Bore 16 is formed with a plurality of longitudinal grooves 18 for engagement with a similarly shaped tool, such as a hex bar for setting the insert in body 10.

The insert body has an inner or forward portion or section 20 formed with external screw threads adapted for engagement with threaded bore 12, and is formed with an outer or rearward head portion including an integral annular flange 21 initially extending radially outwardly from the insert body. This flange has a peripheral rim formed with a plurality of longitudinal serrations 22, and the insert body is formed with an annular groove 23 inwardly of flange 21, so formed that the inner ends of serrations 22 provide sharp, undercut teeth 24. The insert is further formed with an annular groove 25 forming a weakened section 26 of the insert body to permit deflection or bending of the flange 21 for locking the insert in body 10. The inner end of the insert may be tapered and beveled, as shown at 28, to facilitate running in a tapped bore in body 10, or if desired, this inner end may have self tapping formations for running in a plain bore in a work piece or body of material.

The dimensions of counterbore 13 and flange 21 will, in the usual case, be such that the flange is admitted into the counterbore without appreciable resistance, and after the insert has been run into a body 10 to the usual position, as shown in Figures 2 and 3 with the flange 21 substantially flush with surface 11 of body 10, the flange is deformed or bent axially inward by pressure or impact with the use of a tool 30, as shown in Figures 4. Tool 30 has an annular head 31, the end surface of which may be beveled slightly as shown, and upon pressure of the tool against flange 21, the flange will be bent or deflected inwardly to a position substantially 45 degrees from its original position (Fig. 4), and during this action, the pointed ends of the teeth 24 of the serrations 22 will first bite into the beveled wall 14 of the body 10 adjacent counterbore 13 to be forced into a seating and locking position to hold the insert in bore 12, substantially free of any inward radial force on the insert body. During this action, chips 32 may be formed and such chips will be deflected into the space provided by annular groove 23 of the insert body.

In Figure 5 a modified form of the invention is shown, which comprises a stud 35 having an inner externally screw threaded portion 36, similar to threads 20, and outer threads 37. Stud 35 is formed with a flange 21, serrations 22, and grooves 23 and 25, all similar to the similarly numbered parts of the insert of Figures 1 to 4. Stud 35 is installed in a body 10 in a manner substantially similar to that described in connection with insert 15.

What is claimed is:

1. The combination of a one-piece threaded fastener and a body of relatively soft material having a threaded bore and a counterbore with a cylindrical portion of a diameter greater than that of said threaded bore, the bottom of said counterbore being beveled and extending downwardly and inwardly from the wall of said counterbore to said threaded bore, said fastener comprising, an externally screwthreaded cylindrical body receivable in and screw threadedly engageable with the threaded bore in said body of material, said cylindrical body being formed with an annular flange of a diameter greater than that of said bore screw threads and disposed within said counterbore and initially at substantially right angles to the axis of said cylindrical body, said flange being formed along its peripheral edge with a plurality of longitudinal serrations the outer edges of which are parallel to the axis of said cylindrical body and the bottom surfaces of which slope downwardly and outwardly to provide a plurality of sharp points along the periphery of said flange, said flange being of a diameter to be received within the cylindrical portion of the counterbore when the fastener is fully threaded into the bore, said flange having an annular weakened section spaced from said points whereby a longitudinal force on said serrations effects deflection thereof about said weakened section to cause said sharp points to be moved toward said cylindrical body to thereby cut into the body of soft material at the bevel-counterbore substantially free of any inward radial force on said cylindrical body.

2. The combination of a one-piece threaded fastener and a body of relatively soft material having a threaded bore and a counterbore with a cylindrical portion of a diameter greater than that of said threaded bore, the bottom of said counterbore being beveled and extending downwardly and inwardly from the wall of said counterbore to said threaded bore, said fastener comprising, an externally and internally screwthreaded tubular body receivable in and screw threadedly engageable with the threaded bore in said body of material, said tubular body being formed with an annular flange of a diameter greater than that of said external screw threads and disposed within said counterbore and initially at substantially right angles to the axis of said tubular body, said tubular body being free of internal threads adjacent said annular flange, said flange being formed along its peripheral edge with a plurality of longitudinal serrations the outer edges of which are parallel to the axis of said tubular body and the bottom surfaces of which slope downwardly and outwardly to provide a plurality of sharp points along the periphery of said flange, said flange being of a diameter to be received within the cylindrical portion of the counterbore when the fastener is fully threaded into the bore, said flange having an annular weakened section spaced from said points whereby a longitudinal force on said serrations effects deflection thereof about said weakened section to cause said sharp points to be moved toward said tubular body to thereby cut into the body of soft material at the bevel-counterbore without disrupting the internal threads of said tubular body.

3. The combination of a one-piece threaded fastener and a body of relatively soft material having a threaded bore and a counterbore with a cylindrical portion of a diameter greater than that of said threaded bore, the bottom of said counterbore being beveled and extending downwardly and inwardly from the wall of said counterbore to said threaded bore, said fastener comprising, an externally screwthreaded cylindrical body receivable in and screw threadedly engageable with the threaded bore in said body of material, one end of said cylindrical body being formed with an annular flange of a diameter greater than that of said bore screw threads and disposed within said counterbore and initially at substantially right angles to the axis of said cylindrical body, said flange being formed along its peripheral edge with a plurality of longitudinal serrations the outer edges of which are parallel to the axis of said cylindrical body, the bottom surface of said flange further being undercut at an angle to the axis of said cylindrical body whereby the bottom edge of each serration slopes downwardly and outwardly to provide a plurality of sharp points along the periphery of said flange, said flange being of a diameter to be received within the cylindrical portion of the counterbore when the fastener is fully threaded into the bore, said flange having an annular weakened section spaced from said points whereby a longitudinal force on said serrations effects deflection thereof about said weakened section to cause said sharp points to be moved toward said cylindrical body to thereby cut into the body of soft material at the bevel-counterbore substantially free of any inward radial force on said cylindrical body.

References Cited in the file of this patent
UNITED STATES PATENTS

| | | |
|---|---|---|
| 2,444,145 | Rosán | June 29, 1948 |
| 2,782,827 | Rosán | Feb. 26, 1957 |
| 2,886,090 | Rosán | May 12, 1959 |